(12) United States Patent
Terada

(10) Patent No.: US 7,049,509 B2
(45) Date of Patent: May 23, 2006

(54) FIXING STRUCTURE OF BOX

(75) Inventor: Tomoyasu Terada, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/974,912

(22) Filed: Oct. 28, 2004

(65) Prior Publication Data

US 2005/0145409 A1    Jul. 7, 2005

(30) Foreign Application Priority Data

Dec. 12, 2003    (JP) ............................ 2003-414775

(51) Int. Cl.
*H02G 3/08* (2006.01)
(52) U.S. Cl. ..................... 174/50; 174/17 CT; 174/58; 174/135; 174/64; 439/535; 248/906
(58) Field of Classification Search .................. 174/50, 174/17 CT, 58, 60, 61, 64, 135, 65 R; 439/535; 220/3.8, 3.9, 4.02, 3.2; 248/906, 343
See application file for complete search history.

(56) References Cited

U.S. PATENT DOCUMENTS 6,310,287 B1 *  10/2001  Schiedegger et al. ........ 220/3.8
6,642,447 B1 *  11/2003  Mailloux ...................... 174/50
6,768,054 B1 *   7/2004  Sato et al. ..................... 174/50
6,930,246 B1 *   8/2005  Blundo ......................... 174/50
2004/0007371 A1 * 1/2004  Chang .......................... 174/50

FOREIGN PATENT DOCUMENTS

| JP | 2000-316217 | 11/2000 |
| JP | 2001-77551 | 3/2001 |
| JP | 2001-78329 | 3/2001 |

* cited by examiner

*Primary Examiner*—Dhiru R. Patel
(74) *Attorney, Agent, or Firm*—Armstrong, Kratz, Quintos, Hanson & Brooks, LLP

(57) ABSTRACT

A first fixing portion of a generally L-shape is provided in one side of a box and a first attachment portion is provided in a first fixing member to which the box is attached corresponding to the first fixing portion. The first fixing portion of the box is engaged with the first attachment portion of the fixing member. The first fixing portion is provided in the one side of the box and a second fixing portion equipped with a flexible arm is provided in other side of the box. A second attachment portion is provided in the fixing member corresponding to the second fixing portion and the second fixing portion of the box is engaged with the second attachment portion of the fixing member, and where the flexible arm formed outward the box is bent. A moving regulating portion to regulate the moving for transverse and longitudinal directions for the second attachment portion is provided in the second fixing portion. Thus, a fixing structure of a box is provided which is easily attached to an opponent fixing member and is easily detached from it.

4 Claims, 8 Drawing Sheets

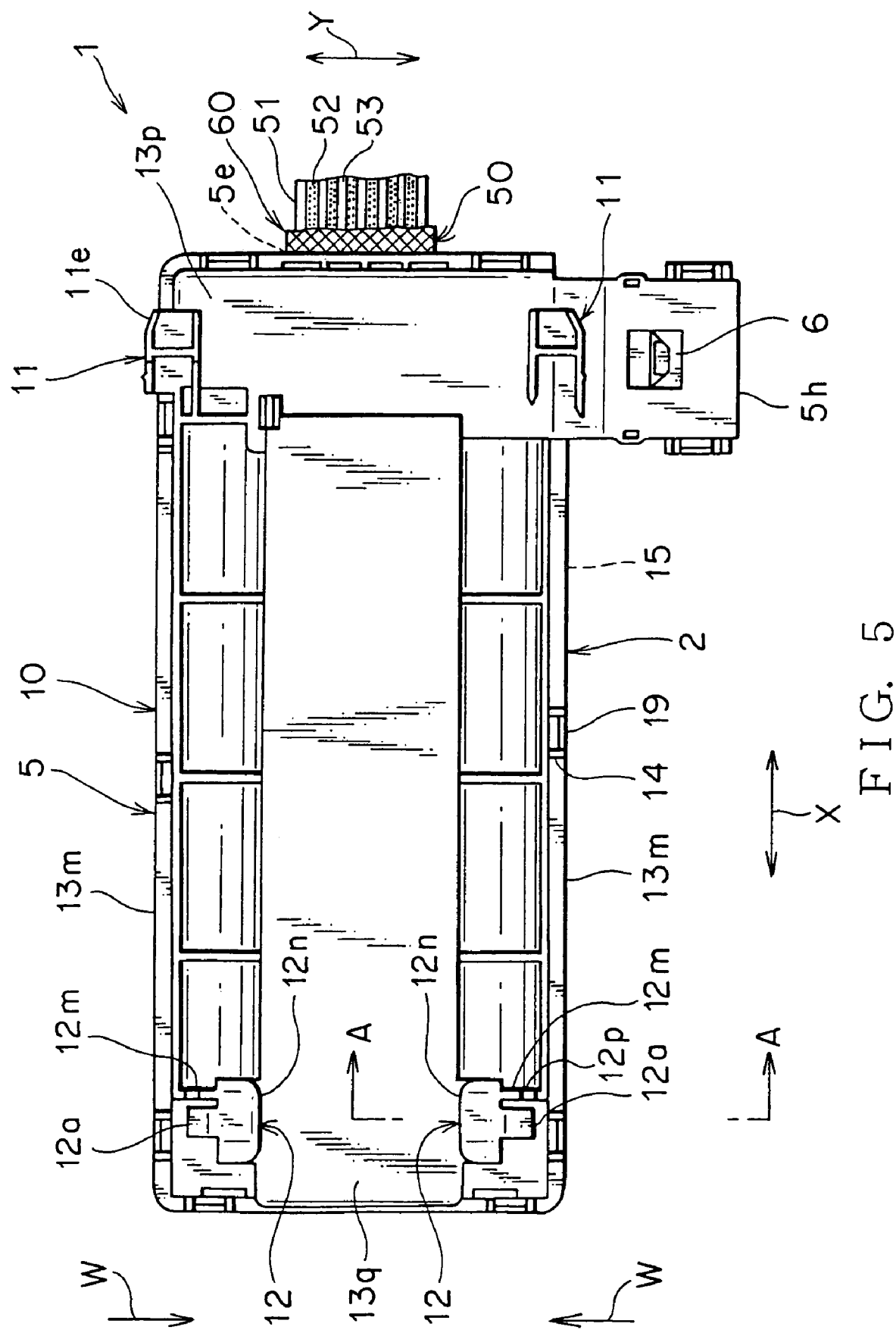
F I G. 5

FIXING STRUCTURE OF BOX

BACKGROUND OF THE INVENTION

1. Field of the Invention

This invention relates to a fixing structure of box placed in a panel and a baggage door near a trim provided at vehicle rear side, utilizing for an electric cable-receiving apparatus capable of receiving excess cables which are lead in or out from repeatedly the box.

2. Description of the Related Art

FIG. 8 shows a conventional electric connection box (pages 1 and 2, FIGS. 1 and 2 in JP,2001-77551,A).

A case body 504 of the electric connection box 501 includes an upper case 502 and a lower case 503.

A block 507 for fitting electrical equipment is housed in the case body 504, and an electrical equipment 505 and 506 are attached to the upper face of the block. Both cases 502 and 503 are inseparably held by engagement between a locking portion 511 and 512 formed on the side faces of the cases. A finger held portion 515 is formed on the top of the upper case 502 in a position in proximity to the upper case-side locking portion 511. This type of electric connection box 501 makes possible that fingers holding the upper case 502 can unlock at the same time even a large size case body 504. For this reason, in the electric connection box 501 described in JP,2001-77551, the upper case 502 is easily detached.

There is another attachment structure of an electric connection box where the connection box is easily attached to and hardly detached from stay and then assuredly attached to the stay (FIG. 3 in Page 2 of JP,2000-316217,A)

There is further attachment structure of an electric connection box where the connection box is easily attached to and detached from vehicle panel without use of tools and the chattering is prevented (JP,2001-78329,A).

In the electric connection box 501 (FIG. 8) described in JP,2001-77551, the upper case 502 is easily detached from the lower case 503 by one hand for the large size case body 504, however, it is not constituted that the electric connection box 501 is easily detached by one hand from the opponent fixing member such as vehicle panel to which the electric connection box 501 is attached.

In the attachment structure of the electric connection box described in JP,2000-316217, the electric connection box is easily attached to and hardly detached from the stay and is assuredly attached to the stay. However, it is not constituted that the electric connection box is easily detached from the opponent fixing member such as stay.

In the attachment structure of the conventional electric connection box described in JP,2001-78329, it is made simple for the operation to attach to and detach from vehicle panel the electric connection box. In order to attach the electric connection box to the vehicle panel, a large opening through-hole corresponding to the size of the electric connection box is required to be provided in the opponent fixing member. Then, the attachment structure of the electric connection box is applied to the limited structure.

SUMMARY OF THE INVENTION

The object of the present invention is to provide a fixing structure of box which is easily attached to an opponent fixing member and is easily detached from it.

According to a first aspect of the present invention we provide a fixing structure of box, wherein a first fixing portion of generally L-shape is provided in one side of a box and a first attachment portion is provided in a fixing member to which the box is attached corresponding to the first fixing portion and the first fixing portion of the box is engaged with the first attachment portion of the fixing member. The first fixing portion is provided in the one side of the box, while a second fixing portion having a flexible arm is provided in other side of the box. A second attachment portion is provided in the fixing member corresponding to the second fixing portion and the second fixing portion of the box is engaged with the second attachment portion of the fixing member. The flexible arm formed outward the box is bent to the arm bending direction and a transverse and/or longitudinal moving regulating portion to regulate moving to the second attachment portion is provided in the second fixing portion.

Thereby, the attachment work of the box to the fixing member is easily made. When the box is attached to the fixing member, the first fixing portion of generally L-shape provided in the side of the box is engaged with the first attachment portion of the fixing member. The second fixing portion having the flexible arm of the box is engaged with the second attachment portion of the fixing member. At this time, the flexible arm formed outward the box is bent to the arm bending direction and is restored to the original position by restoring elastic force and the second fixing portion of the box is easily engaged with the second attachment portion of the fixing member. Since the flexible arm is formed outward the box, the attachment work of the box to the fixing member is easily made. If the flexible arm formed outward the box is depressed inward the box, the unlocking of the second fixing portion of the box to the second attachment portion of the fixing member is easily made. Since the transverse and/or longitudinal moving regulating portion to regulate moving to the second attachment portion of the fixing member is provided in the second fixing portion of the box, the flexible arm provided in the second fixing portion of the box is deformed and hence the damage of the flexible arm is prevented.

According to a second aspect of the invention, preferably, the second fixing portion is provided in the box at two places and the flexible arms are provided in outward both sides of the box.

Thereby, the flexible arm of the second fixing portion of the box is depressed from both sides of the box and the unlocking of the second fixing portion of the box and the second attachment portion of the fixing member is easily made.

According to a third aspect of the invention, preferably, the moving regulating portion is formed as a rib to regulate the bending of the flexible arm and the rib is provided in one side of the second fixing portion and inside the box.

Thereby, since the rib to regulate the bending of the flexible arm of the second fixing portion of the box is provided in one side of the second fixing portion and inside the box, fingers and tools are easily accessible from the other side of the second fixing portion and also from outside the box. The unlocking of the second fixing portion of the box and the second attachment portion of the fixing member is easily made.

BRIEF DESCRIPTION OF THE DRAWINGS

FIG. 5 is a plan view of a box;

DESCRIPTION OF THE PREFERRED EMBODIMENTS

Figure 1:
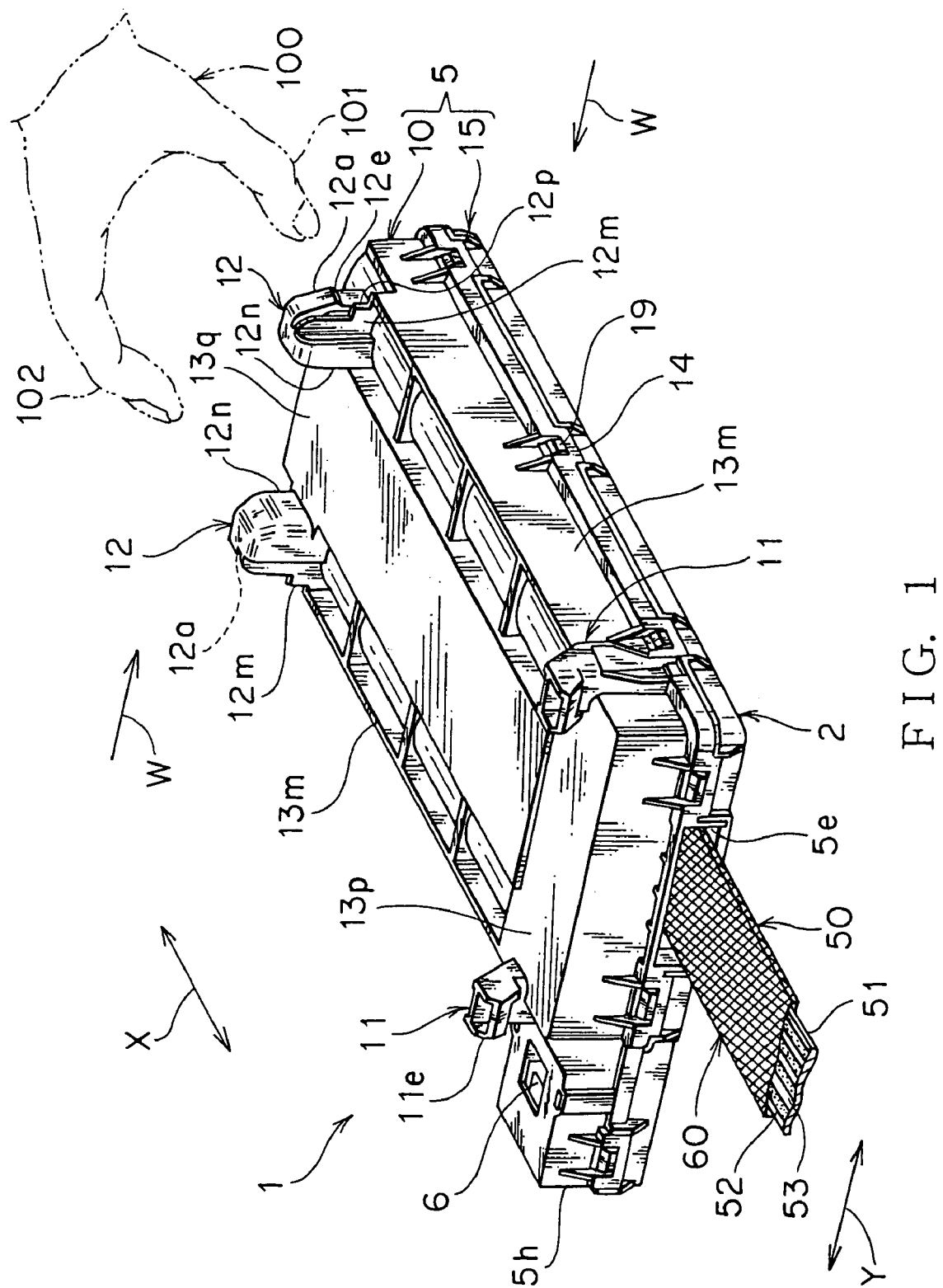
FIG. 1 is a perspective view showing an embodiment of a fixing structure of a box.

A fixing structure of box is equipped in a panel 80 (FIGS. 3, 4 and 7A, 7B) and a baggage door (not shown) near a trim provided in rear side of a vehicle (not shown). Described is an electric cable-receiving apparatus 1 capable of receiving an excess length of a cable 51 which is lead in or out from repeatedly a box 5 (FIGS. 1 to 5). The electric cable-receiving apparatus 1 (FIG. 2) is at least provided with an apparatus main body 2 receiving the excess length portion of the electric cable 51 constituting a wiring harness 50.

Figure 2:
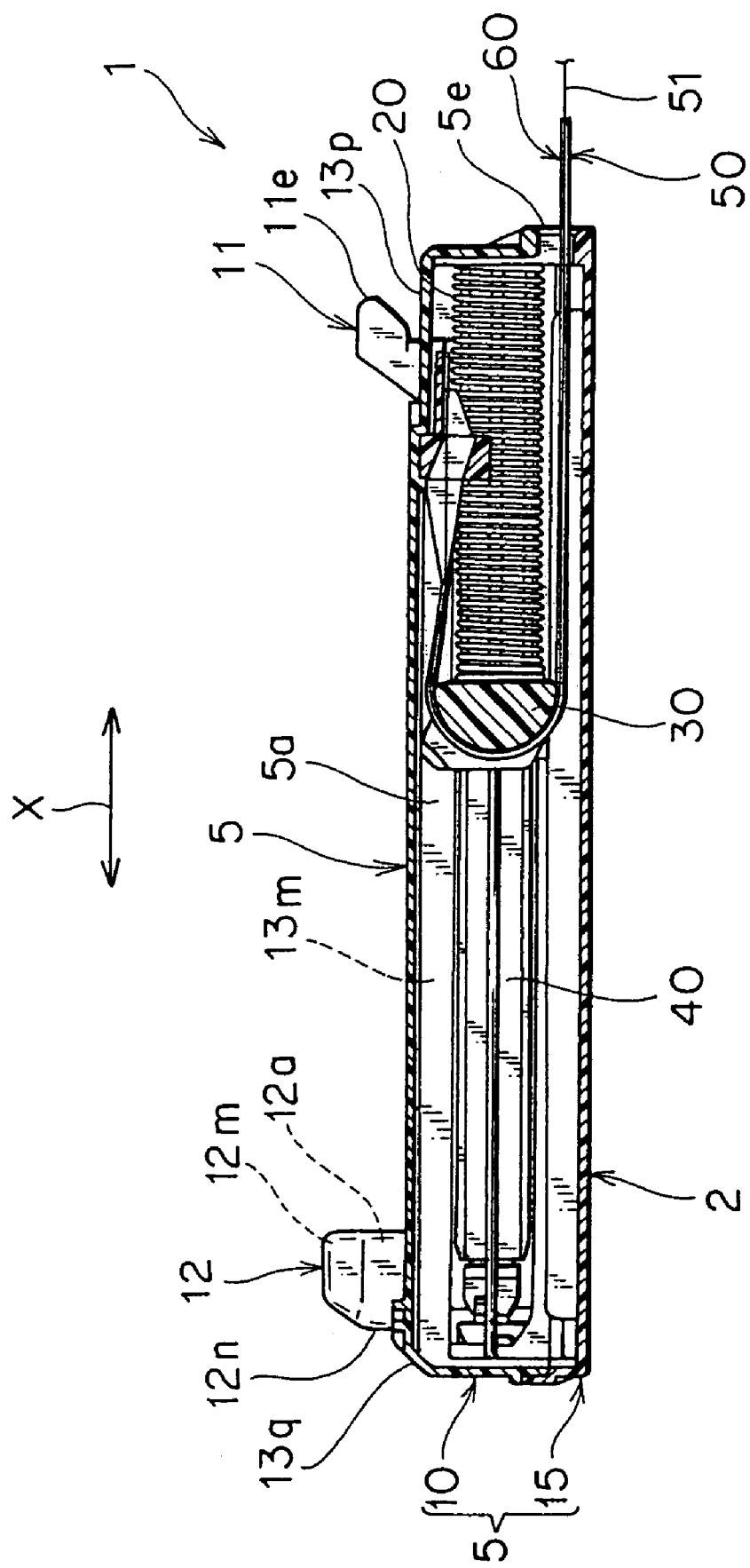
FIG. 2 is a sectional view of a box.

As shown in FIGS. 1 and 2, the apparatus main body 2 includes the electric cable 51 constituting the wiring harness 50, the case 5, which is made of synthetic resin, of generally rectangle shaped box having an opening 5e through which the electric cable 51 is received and is lead in or out, an urging member 20 (FIG. 2) made of metal to urge the electric cable 51 to the direction of pulling-in, a harness wrapping member 30 made of synthetic resin reciprocative with the urging force of the urging member 20, a guiding pin 40 made of synthetic resin which guides the urging member 20 for keeping a correct position when the urging member expands and contracts to the longitudinal direction X of the case 5, that is, the transverse direction X of the case 5. The urging member 20 is formed with a compression coil spring made of metal generating a restoring elastic force when compressed. A connector 6 connected to the electric cable 51 is received in a holder portion 5h of generally rectangle shaped box provided in the case 5 (FIG. 1 and FIGS. 3 to 5).

As shown in FIGS. 1 to 4, the case 5 made of synthetic resin is provided with a box main body 10 at the upper side and a cover 15 made of synthctic resin placed under the box main body 10. As shown in FIG. 1 and FIGS. 3 to 5, the case 5 of a generally rectangular shape is provided with each locking portion 14 provided in the box main body 10 and each locking portion 19 provided in the cover 15. Both locking portions are engaged. The case 5 bas a function of protecting the electric cable 51 inside a protector tube 60 (FIGS. 1 and 5) wound inside a receiving portion 5a (FIG. 2) from the opening 5e of the case 5.

Figure 3:
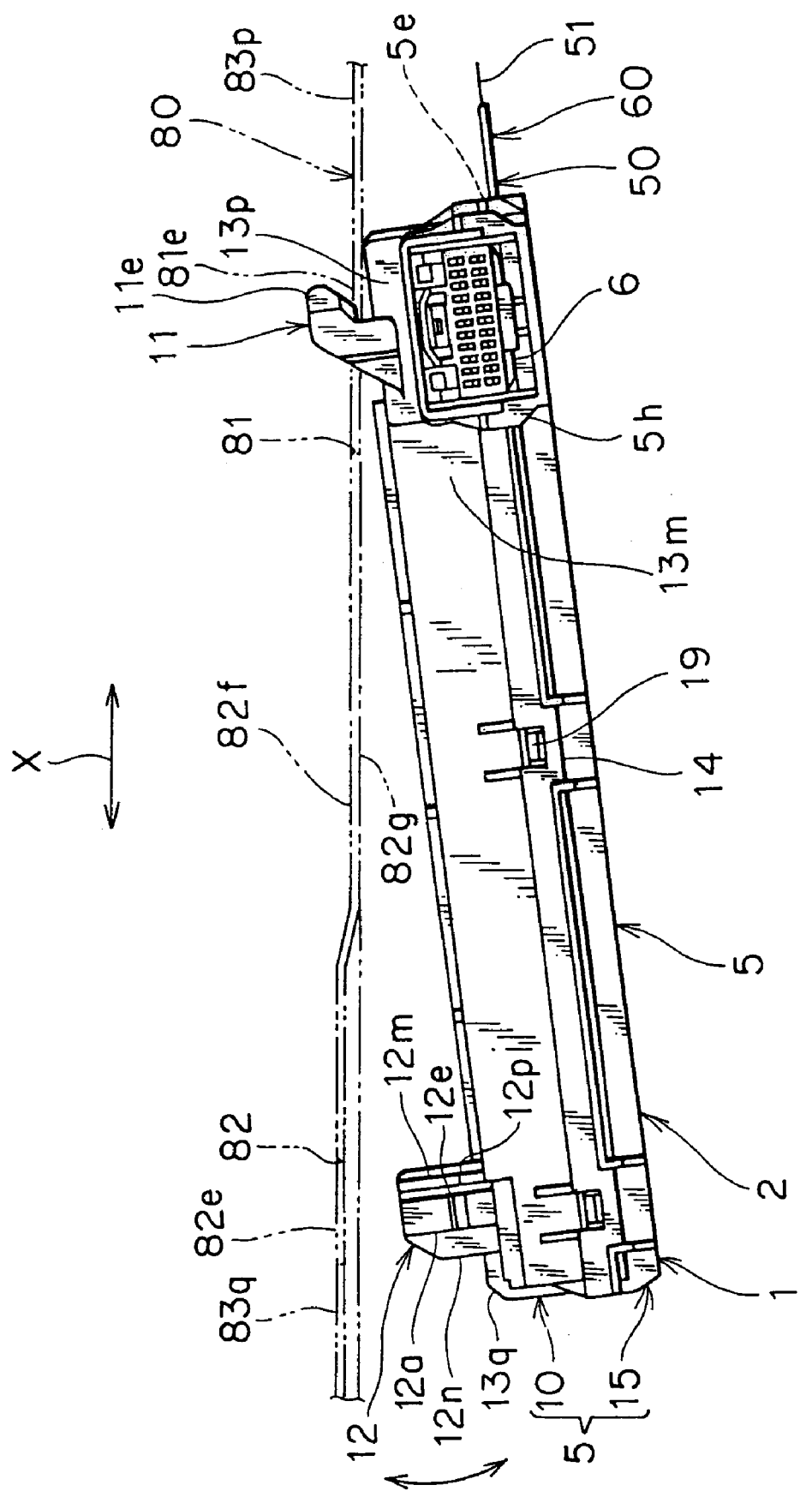
FIG. 3 is a side view showing an attachment of a box to a fixing member.
Figure 4:
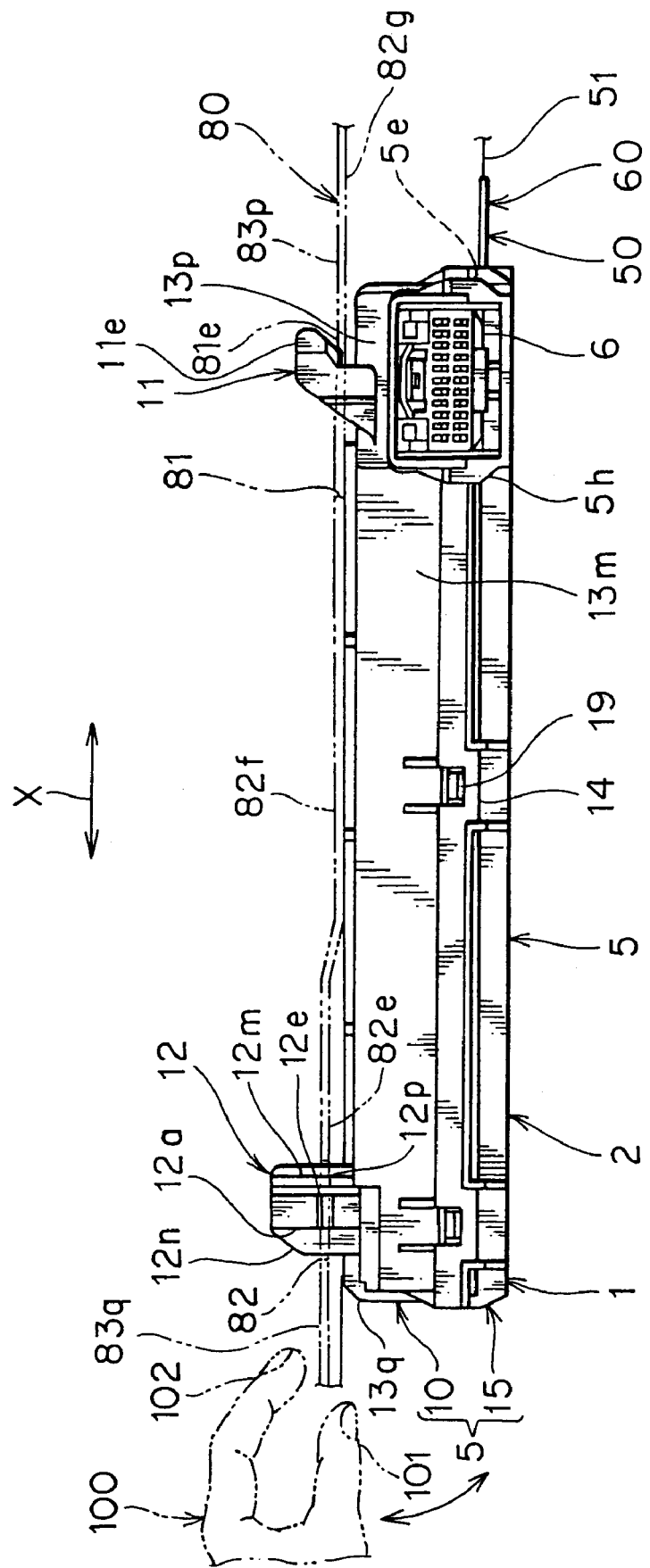
FIG. 4 is a side view showing an attachment of a box to a fixing member.
Figure 6:
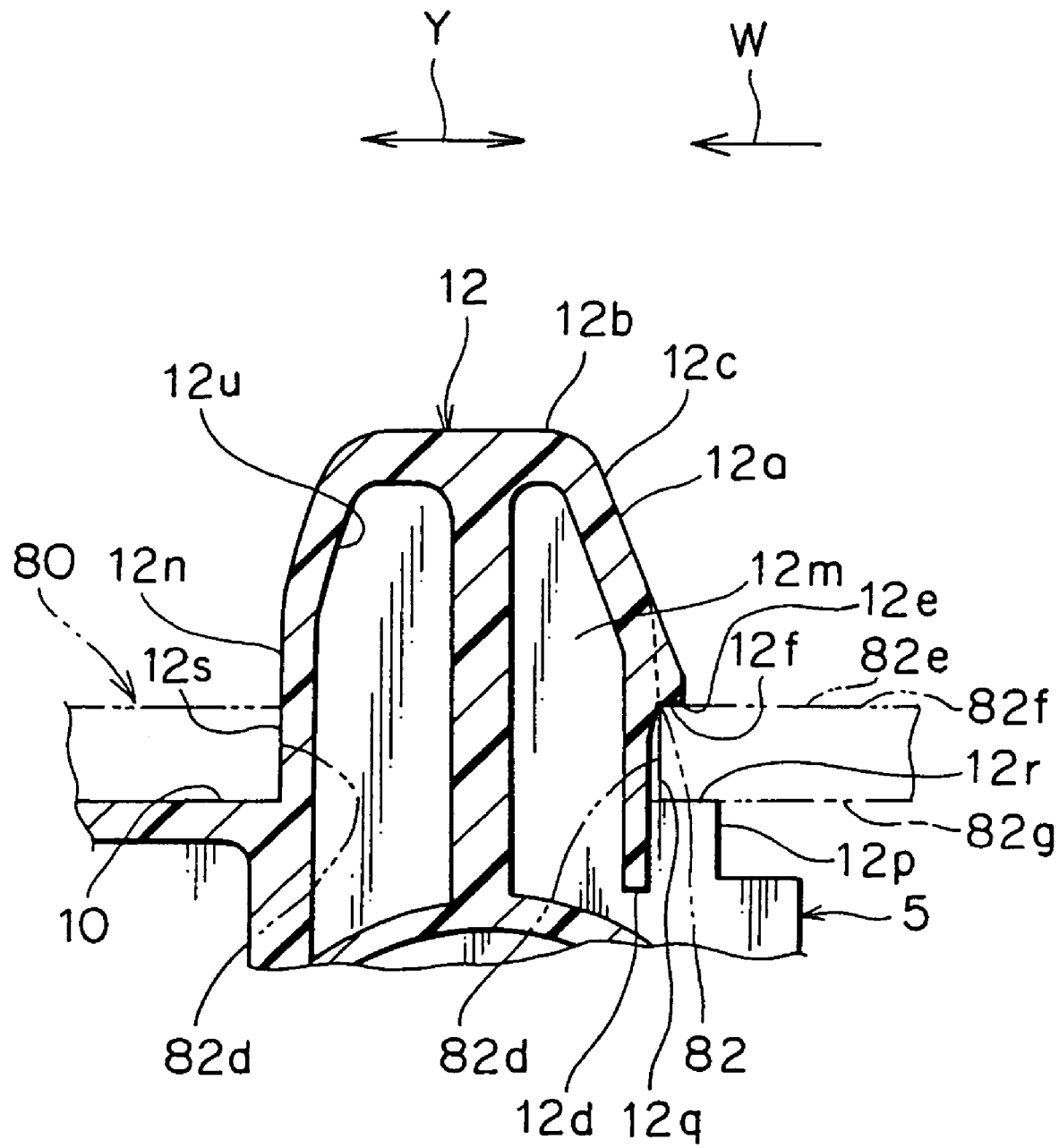
FIG. 6 is a sectional view taken along line A—A of FIG. 5.

As shown in FIGS. 1 and 5, a first fixing portion 11 of a generally L-shape is provided in a side portion 13m of the box 5 made of synthetic resin. The first fixing portion 11 of an L-shape is shown as the reversed L-shaped one in FIGS. 1 to 4. Corresponding to the pair of the first fixing members 11 of L-shape, a pair of first attachment portions 81 of generally rectangularly-shaped through-holes are provided in the fixing member 80 (FIG. 7A) made of metal to which the box 5 made of synthetic resin is attached. As shown in FIGS. 3 and 4, the first fixing portion 11 of the box 5 is engaged with the first attachment portion 81 of the fixing member 80. As shown in FIGS. 1 to 5, the first fixing portion 11 is provided in one side portion 13p of the box 5. The first fixing portion 11 provided in the one side 13p of the case 5 is engaged with the first attachment portion 81 provided in one side 83 of the fixing member 80. A second fixing portion 12 equipped with a flexible arm 12a is provided in the other side 13q in opposition to the one side 13p of the box 5. In order to make the box 5 lighter and the materials used for making the box 5 less to result in the low cost, as shown in FIG. 6, the inside of a base 12n (transverse moving regulating portion) constituting the fixing portion 12 is a cavity and forms a hollow 12u inside of the base 12n.

Figure 7:
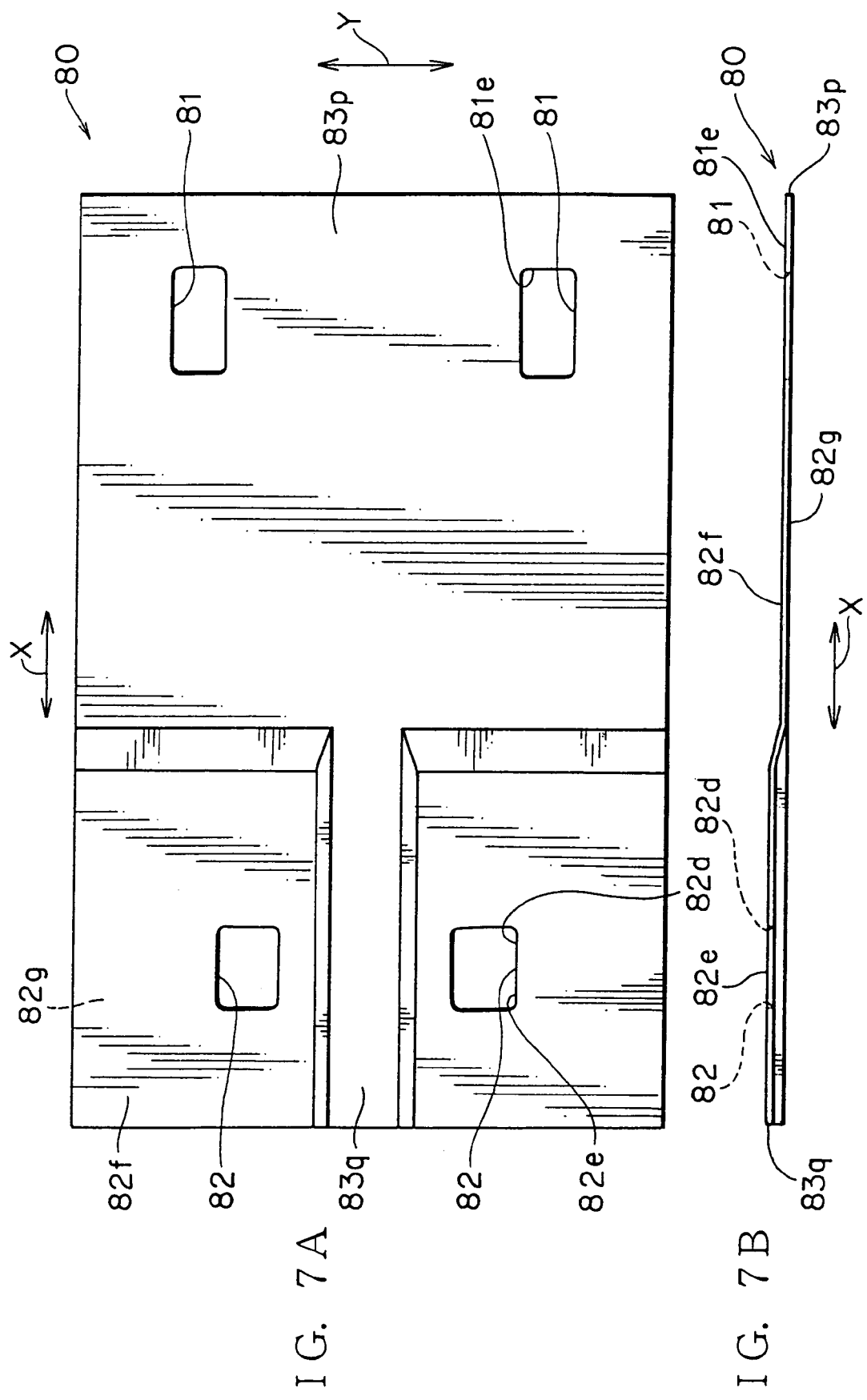
FIG. 7A is a plan view of a fixing member and FIG. 7B is a side view of the fixing member.
Figure 8:
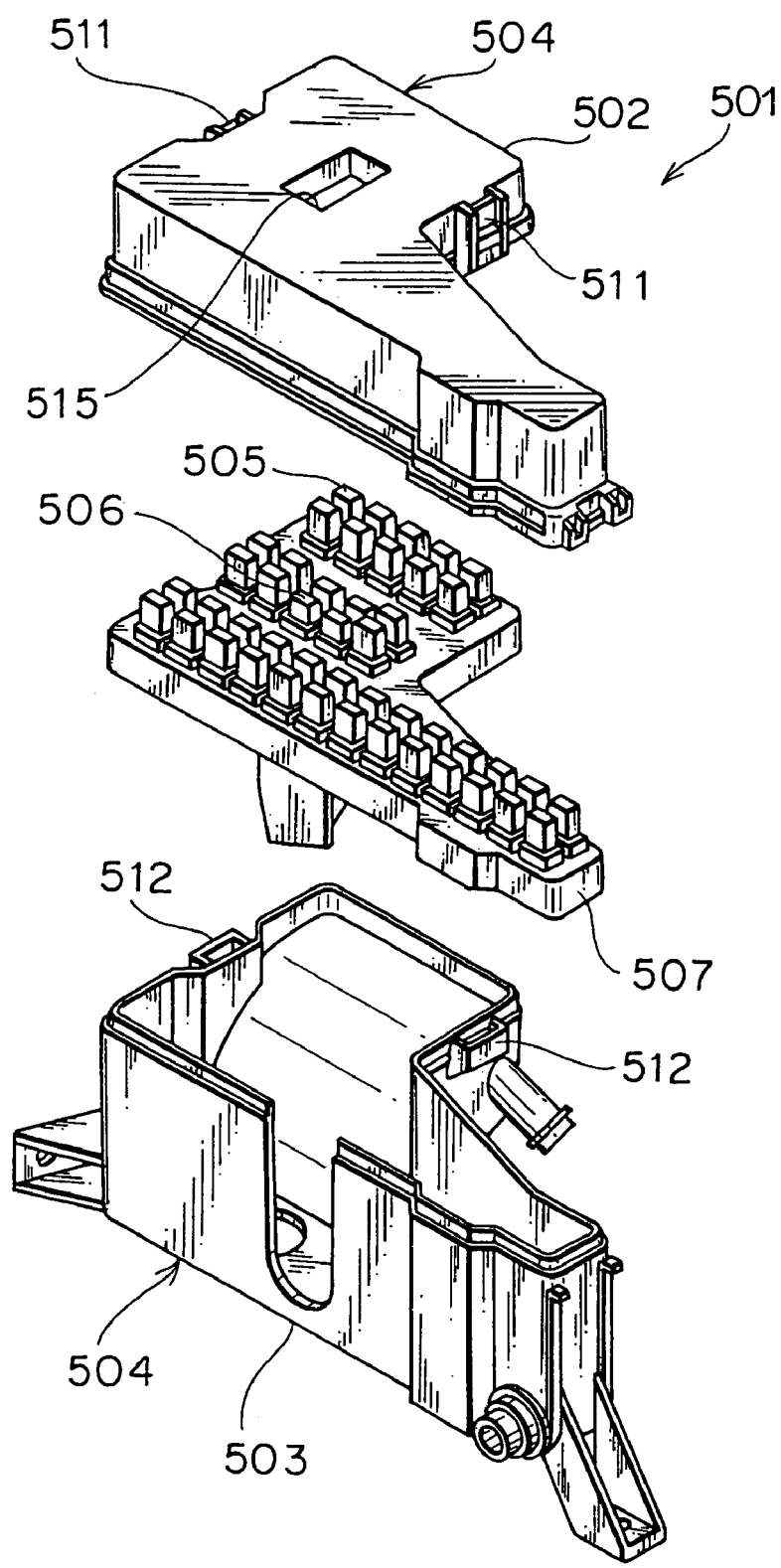
FIG. 8 is a perspective view of a conventional electric connection box.

Corresponding to the pair of the second fixing members 12 provided in the other side portion 13q of the box 5, a pair of a second attachment portions 82 of generally rectangular shape are provided in the other side portion 83q of the fixing member 80, as shown in FIG. 7A. As shown in FIGS. 3 and 4, the second fixing portion 12 of the box 5 is engaged with the second attachment portion 82 of the fixing member 80. The flexible arm 12a (FIG. 1 and FIGS. 3 to 6) formed outward of the box 5 is bent to the arm bending direction W (FIGS. 1, 5 and 6). The transverse moving regulating portion 12n of transverse direction X (FIGS. 1, 4 and 5) which regulates the movement of the second attachment portion 82 of the fixing member 80 (FIGS. 7A and 7B) to the transverse direction X, is provided in the second fixing portion 12 of the box 5. A longitudinal moving regulating portion 12m (rib) of longitudinal direction Y (FIGS. 1 and 5) which regulates the movement of the second attachment portion 82 of the fixing member 80 (FIGS. 7A and 7B) to the longitudinal direction Y, is provided in the second fixing portion 12 of the box 5. The second fixing portion 12 of the box 5 is provided with the transverse moving regulating portion 12n of transverse direction X (FIGS. 1, 4 and 5) and the moving regulating portion 12m of longitudinal direction Y (FIGS. 1 and 5). Depending on the design of the second fixing portion 12 of the box 5, either one of the transverse moving regulating portion 12n of transverse direction X (FIGS. 1, 4 and 5) and the longitudinal moving regulating portion 12m of longitudinal direction Y (FIGS. 1 and 5) may be provided in the second fixing portion 12 of the box. Because the definitions of "transverse" and "longitudinal" are only used expediently for the explanation of each portion, the definitions can be changed depending on the design of the box 5.

If the second fixing portion 12 equipped with the transverse moving regulating portion 12n of transverse direction X (FIGS. 1, 4 and 5) and/or the longitudinal moving regulating portion 12m of longitudinal direction Y (FIGS. 1 and 5), is constituted in the box 5, the attachment work of the box 5 to the fixing member 80 is easily made. When the box 5 is equipped in the fixing member 80 as shown in FIG. 3, a tip portion 11e of the first fixing portion 11 of generally L shape provided in the side 13m of the box 5, is engaged with an edge end 81e (FIGS. 3 and 7A) of the first attachment portion 81 of generally rectangle through-hole provided in the fixing member 80. The box 5 is then rotated toward the fixing member 80 centering at the first fixing portion 11 of the box 5. As shown in FIG. 4, the second fixing portion 12 equipped with the flexible arm 12a of the box 5 is engaged with the second attachment portion 82 of generally rectangle through-hole provided in the fixing member 80. The pair of the flexible arms 12a formed outward of the box 5 are then bent along the arm bending direction W (FIGS. 1, 5 and 6) and the flexible arm 12a is returned to the original position due to restoring elastic force, and both the second fixing portion 12 of the box 5 and the second attachment portion 82 of the fixing member (FIGS. 3, 4, 6 and 7A) are easily engaged. As shown in FIG. 6, a seat portion 12e of the flexible arm 12a of the second fixing portion 12 provided in the box 5 is engaged with an edge end 82e of the second attachment portion 82 of a generally rectangular through-hole shape provided in the fixing member 80.

Because the flexible arm 12a is formed outward of the box 5, the attachment work of the box to the fixing member 80 is easily made. Because the flexible arm 12a formed outward of the box 5 is depressed inward of the box 5, that is, along the arm bending direction and the second fixing portion 12 equipped with the flexible arm 12a of the box 5 is engaged with the second attachment portion 82 of a generally rectangular through-hole shape of the fixing member 80. When the flexible arm 12a of the second fixing portion 12 of the box 5 engaged with the second attachment portion 82 of a generally rectangular through-hole shape of the fixing member 80 is depressed along to the inward direction of the box 5, the second fixing portion 12 of the box 5 is easily unlocked from the second attachment portion 82 of the fixing member 80.

The longitudinal moving regulating portion 12m and the transverse moving regulating portion 12n of transverse direction X and longitudinal direction Y, respectively, to regulate the movement to the second attachment portion 82 of the fixing member 80 are provided in the second fixing portion 12 of the box and when the flexible arm 12a provided in the second fixing portion of the body 5 is largely deformed, it is prevented from being damaged. As shown in FIG. 6, the longitudinal moving regulating portion 12m of longitudinal direction Y provided in the second fixing portion of the box 5 is formed as the rib 12m to regulate the bending of the flexible arm 12a. The rib 12m regulates the bending of the flexible arm 12a and is provided with a step portion 12p which positions the second fixing portion 12 of the box 5 to the second attachment portion 82 of the fixing member 80. As shown in FIG. 6, a step 12p is formed to provide a regulating face 12q abutting an inner circumferential portion 82d of the second attachment portion 82 of generally rectangle through-hole in the fixing member 80 and other regulating face 12r abutting to an under face 82g of the other edge end 82e of the second attachment portion 82 of the fixing member 80. The base 12n of the second fixing portion 12 of the box 5 is formed to provide another regulating face 12s abutting the inner circumferential portion 82d of the second attachment portion 82 of generally rectangle through-hole provided in the fixing member 80. The regulating face 12q of the rib 12m of the second fixing portion 12 in the box 5 abuts the inner circumferential portion 82d of the second attachment portion 82 of generally rectangle through-hole in the fixing member 80 and the other regulating face 12s of the base 12n of the second fixing portion 12 in the box 5 abuts the inner circumferential portion 82d of the second attachment portion 82 of rectangle through-hole in the fixing member 80 so that the movement of the box 5 is regulated for the longitudinal direction Y to the fixing member 80. Thereby, the second fixing portion 12 of the box 5 is largely moved to the longitudinal direction Y against the second attachment portion 82 of the fixing member 80 and the flexible arm 12a is largely bent and hence it is avoided that a foot portion 12b of the flexible arm 12a is subjected to strong force and the flexible arm 12a is damaged.

As shown in FIGS. 1 and 5, the second fixing portion 12 is provided in the box 5 at least two places. The pair of the flexible arms 12a are provided outward of the both sides 13m of the box 5. As shown in FIG. 6, the flexible arm 12a includes the foot 12b provided in the upper side of the base 12n, a slanted connection portion 12c extending from the foot 12b to the outside of the box 5 to connect the edge end 82e of the second attachment portion 82 of the fixing member, the seat 12e to abut an edge end 82e of the second attachment portion 82 of the fixing member 80 provided at the tip of the slanted connection portion 12c, a locking face 12f where the flexible arm 12a abuts an upper face of 82f of the fixing member 80 when the bent arm 12a returns to original position by restoring force, a thin locking piece 12d to contact the inner circumference 82d of the second attachment portion 82 of generally rectangle shape provided in the fixing member 80, extending to at the tip of the seat 12e. The flexible arm 12a extends from the root 12b of the upper side of the base 12n and the locking face 12f of the flexible arm 12a abuts the upper face 82f of the fixing member 80. However, the definition of upper and lower in the specification is expediently used and is not exclusive.

When the flexible arm 12a of the second fixing portion 12 of the box 5 is depressed inward the box 5 by a hand 100 (FIGS. 1 and 4), fingers 101 and 102, or a tool (not shown) from both sides of the box 5, the locking between the fixing portion 12 of the box 5 and the second attachment portion 82 of the fixing member 80 is unlocked. The pair of the flexible arms 12a (FIGS. 1 and 5) provided in the box 5 is easily bent inward the box 5 by two fingers 101 and 102 of thumb 101, and forefinger 102 or middle finger (not shown) of one hand 100 (FIG. 1). Thereby, the unlocking of the fixing portion 12 of the box 5 and the second attachment portion 82 of the fixing member 80 is easily attained (FIG. 3).

The moving regulating portion 12m (FIGS. 1 and 3 to 6) is formed as the rib 12m of step shape to regulate the bending of the flexible arm 12a. The rib 12m is provided in the one side of the fixing portion 12 and inside the box 5. The rib 12m of the fixing portion 12 is provided to face the first fixing portion 11. Elucidating the detail referring to FIG. 5, the rib 12m is placed in the one side of the fixing portion 12 and inward the box 5 when the box 5 is viewed in plan.

Because the rib 12m, which regulates the bending of the flexible arm 12a of the second fixing portion 12 of the box 5, is placed in the one side of the fixing portion 12 and inward the box 5, the fingers 101 and 102 of the hand 100 (FIGS. 1 and 4) and a tool (not shown) are accessible from the opposite side of the second fixing portion 12 and the outside of the box 5. The rib 12m, which regulates the bending of the flexible arm 12a, is not placed in the other side of the fixing portion 12 and outward the box 5, and the fingers 101 and 102 of the hand 100 and a tool (not shown) are accessible from the opposite side of the second fixing portion 12 and the outside of the box 5. Thereby, the unlocking the second fixing portion of the box 5 and the second attachment portion 82 of the fixing member 80 is easily attained.

The box main body 10 and the cover 15 constituting the case 5 of the apparatus main body 2 are made of synthetic resin including at least either one of polypropylene (PP) or polyethylene (PE) Polypropylene and polyethylene are the thermoplastic synthetic resins which are excellent in mass production of the ejection fabrication.

The molding body made of polyethylene is excellent in molding and electric insulation characteristics. The molding body made of polypropylene is also excellent in electric insulation. Moreover, the molding body made of polypropylene has a more glossy surface than that of polyethylene and has excellent appearance. The molding body made of polypropylene has large rigidity and small stress cracking. The molding body made of polypropylene has high strength of a repetition bending stress. Therefore, the molding body made of polypropylene is preferably used for the portion which is provided with locking and engaging portion such as flexible arm and requires bending characteristics.

Although the box main body 10 of the case 5 is placed in the upper side and the cover 15 of the case 5 is placed in the lower side, the definition of "the upper and lower sides" in this specification is expediently for explaining each part and is not necessarily same as the direction of the box fixing structure of the case 5 actually used. When the fixing structure of box of the present invention is applied to the case 5 of the electric cable-receiving apparatus 1 capable of receiving the excess cable of the cable 51 which is repeatedly lead from or in the case 5, the attachment direction of the apparatus main body 2 constituting the electric cable-receiving apparatus 1 is possible to any directions.

Because the electric cable 51 is repeatedly lead in or out from the case 5, it is covered by the protecting tube 60. The protecting tube 60 to prevent the electric cable 51 from damage is braided. The braid 60 is reticulated and is made of synthetic resin. The braid 60 is braided in the shape of a hollow belt by thread of polyethylene terephthalate (PET) of diameter of 0.23 mm. Polyethylene terephthalate is excellent in size stability, strength, heat resistance, sliding characteristic, and electrical property and is suitable material for braiding.

A flat harness is used for the electric cable 51 because of thin and flexible property. As the flat harness, for example, there are a circuit equipped with circle conductive ribbon cable, flexible flat circuit, and flexible print circuit. As shown in FIGS. 1 and 5, the flexible flat circuit means "Flexible Flat Cable" and is abbreviated to "FFC". The flexible flat circuit 51 is formed with a plurality of circuit conductors 52 which are placed in parallel with insulation sheet 53. As for the circuit conductor, thin wire, fine single wire or enamel wire is utilized as example. An insulation sheet 53 is made of polyethylene terephthalate (PET) film which is excellent in flexibility, size stability, strength, heat resistance, sliding characteristic, and electrical property.

Flexible printed circuit is abbreviated to FPC. Flexible printed circuit (FPC) is that a plurality of circuit conductors made of metal foil such as copper foil are printed on insulation sheet on which protective layer is formed.

The present invention may be embodied in other specific forms without departing from the spirit or essential characteristics thereof.

What is claimed is:

1. A fixing structure of box, comprising:
   a first fixing portion of L-shape provided in one side of a box;
   a first attachment portion provided in a fixing member to which the box is attached, corresponding to the first fixing portion, wherein the first fixing portion of the box is engaged with the first attachment portion of the fixing member;
   a second fixing portion having a flexible arm provided in other side of the box;
   a second attachment portion provided in the fixing member, corresponding to the second fixing portion, wherein the second fixing portion of the box is engaged with the second attachment portion of the fixing member and thereby the flexible arm formed outward the box being bent to the arm bending direction; and
   a transverse moving regulating portion to regulate moving to the second attachment portion provided in the second fixing portion or a longitudinal moving regulating portion to regulate moving to the second attachment portion provided in the second fixing portion.

2. The fixing structure of box according claim 1, wherein the second fixing portion is provided in two places of the box and the flexible arm is formed outward both sides of the box.

3. The fixing structure of box according to claim 1, wherein the moving regulating portion is formed as a rib to regulate the bending of the flexible arm and the rib is provided in one side of the fixing portion and inside the box.

4. The fixing structure of box according to claim 2, wherein the moving regulating portion is formed as a rib to regulate the bending of the flexible arm and the rib is provided in one side of the fixing portion and inside the box.

* * * * *